United States Patent
Lee et al.

(10) Patent No.: US 11,420,527 B2
(45) Date of Patent: Aug. 23, 2022

(54) ELECTRIC VEHICLE CHARGING SYSTEM WITH BATTERY TEMPERATURE CONTROL

(71) Applicant: Standard Energy Inc., Daejeon (KR)

(72) Inventors: Dongyoung Lee, Seoul (KR); Bugi Kim, Sejong (KR)

(73) Assignee: Standard Engery Inc., Daejeon (KR)

(*) Notice: Subject to any disclaimer, the term of this patent is extended or adjusted under 35 U.S.C. 154(b) by 0 days.

(21) Appl. No.: 17/303,360

(22) Filed: May 27, 2021

(65) Prior Publication Data
US 2022/0009367 A1   Jan. 13, 2022

Related U.S. Application Data

(60) Provisional application No. 63/041,415, filed on Jun. 19, 2020.

(51) Int. Cl.
| | |
|---|---|
| *H02J 7/00* | (2006.01) |
| *B60L 53/62* | (2019.01) |
| *B60L 53/66* | (2019.01) |
| *H01M 10/625* | (2014.01) |
| *H01M 10/6571* | (2014.01) |

(Continued)

(52) U.S. Cl.
CPC ............... *B60L 53/62* (2019.02); *B60L 53/66* (2019.02); *H01M 10/615* (2015.04); *H01M 10/625* (2015.04); *H01M 10/6571* (2015.04); *H02J 7/007194* (2020.01); *H01M 10/48* (2013.01); *H01M 2220/20* (2013.01)

(58) Field of Classification Search
CPC ...... B60L 53/62; B60L 53/66; H01M 10/615; H01M 10/625; H01M 10/6571; H01M 2220/20; H02J 7/007194

USPC .......................................... 701/22; 320/109
See application file for complete search history.

(56) References Cited

U.S. PATENT DOCUMENTS 9,088,057 B2   7/2015   Kim et al.
9,527,403 B2   12/2016  Mardall et al.
(Continued)

FOREIGN PATENT DOCUMENTS

DE   10 2019 117 565 A1   12/2020

OTHER PUBLICATIONS

Collin et al., "Advanced Electric Vehicle Fast-Charging Technologies", Energies, vol. 12, No. 1839, 26 pages, 2019.
(Continued)

*Primary Examiner* — Zixuan Zhou
(74) *Attorney, Agent, or Firm* — Knobbe, Martens, Olson & Bear, LLP

(57) ABSTRACT

A method of charging a battery of an electric vehicle includes: determining that a battery temperature of a secondary battery is below a predetermined lower temperature limit suitable for charging the secondary battery at a high charging power greater than 18 kW; externally applying, by contactless energy transfer means, electromagnetic energy to an energy conversion module of the electric vehicle; converting the electromagnetic energy to heat and heating the secondary battery to a temperature above the lower temperature limit; and charging the secondary battery at the high charging power while maintaining the battery temperature between the lower temperature limit and an upper temperature limit at least in part by controlling a magnitude of the electromagnetic energy.

26 Claims, 11 Drawing Sheets

(51) Int. Cl.
*H01M 10/615* (2014.01)
*H01M 10/48* (2006.01)

(56) References Cited

U.S. PATENT DOCUMENTS

| | | |
|---|---|---|
| 9,597,966 B2 | 3/2017 | Sridhar et al. |
| 9,694,699 B2 | 7/2017 | Kelty et al. |
| 10,017,072 B2 | 7/2018 | Galamb |
| 10,807,479 B2 | 10/2020 | Ryu et al. |
| 10,882,413 B2 | 1/2021 | Ferran et al. |
| 2010/0072954 A1 | 3/2010 | Kohn et al. |
| 2011/0012562 A1 | 1/2011 | Paryani |
| 2012/0043935 A1 | 2/2012 | Dyer et al. |
| 2013/0289812 A1 | 10/2013 | Anzicek |
| 2015/0180257 A1 | 6/2015 | Snyder et al. |
| 2015/0306974 A1 | 10/2015 | Mardall et al. |
| 2017/0088005 A1 | 3/2017 | Christen et al. |
| 2017/0232865 A1 | 8/2017 | Christen et al. |
| 2019/0152286 A1* | 5/2019 | Lee .................. B60H 1/00485 |
| 2019/0190095 A1* | 6/2019 | Park ..................... B60L 58/26 |

OTHER PUBLICATIONS

Hardman et al., "A review of consumer preferences of and interactions with electric vehicle charging infrastructure", Transportation Research Part D, vol. 62, pp. 508-523, 2018.

International Search Report and Written Opinion dated Sep. 14, 2021 in counterpart International Application No. PCT/US2021/034983 in 21 pages.

Janakiraman et al., "Review—Lithium Plating Detection Methods in Li-Ion Batteries", Journal of The Electrochemical Society, vol. 167, No. 160552, 23 pages, 2020.

Kettles, D., "Electric Vehicle Charging Technology Analysis and Standards", Florida Solar Energy Center, University of Central Florida, FSEC Report No. FSEC-CR-1996-15, 41 pages, Feb. 2015.

Keyser et al., Enabling fast charging e Battery thermal considerations, Journal of Power Sources, vol. 367, pp. 228-236, 2017.

Miao et al., "Current Li-Ion Battery Technologies in Electric Vehicles and Opportunities for Advancements", Energies, vol. 12, No. 1074, 20 pages, 2019.

\* cited by examiner

ELECTRIC VEHICLE CHARGING SYSTEM WITH BATTERY TEMPERATURE CONTROL

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

This application claims the priority benefit under 35 U.S.C. § 119(e) to U.S. Provisional Patent Application No. 63/041,415, filed Jun. 19, 2020, entitled "THERMAL ANOMALY MANAGEMENT DEVICE FOR ELECTRIC VEHICLE BATTERY," the content of which is hereby expressly incorporated by reference in its entirety.

BACKGROUND

Field

The disclosed technology generally relates to an electric vehicle charging system and more particularly to an electric vehicle charging system with battery temperature control and a method of charging a secondary battery using the same.

Description of the Related Art

Although a rapid advancement of electric vehicles has led to a corresponding rapid advancement in secondary battery and battery management technologies, speed and safety associated with charging the secondary battery continue to remain a concern. As the speed of charging the secondary battery continue to improve, there is an increasing need for improving the reliability and safety features associated with charging the secondary battery.

SUMMARY

In one aspect, a method of charging a battery of an electric vehicle includes determining that a battery temperature of a secondary battery is below a predetermined lower temperature limit suitable for charging the secondary battery at a high charging power greater than 18 kW. The method additionally includes externally applying, by contactless energy transfer means, electromagnetic energy to the electric vehicle. The method additionally includes converting the electromagnetic energy to heat and heating the secondary battery to a temperature above the lower temperature limit. The method further includes charging the secondary battery at the high charging power while maintaining the battery temperature between the lower temperature limit and an upper temperature limit at least in part by controlling a magnitude of the electromagnetic energy.

In another aspect, an electric vehicle charging station comprises a battery charging module configured to provide charging energy to a secondary battery of an electric vehicle. The charging station additionally comprises an electromagnetic energy generator configured to generate and transfer electromagnetic energy, by contactless energy transfer means, to the electric vehicle. The charging station additionally comprises a communication interface configured to receive a battery temperature of the secondary battery from the electric vehicle. The charging station further comprises a control unit configured to, upon determining that the battery temperature of the secondary battery is below a predetermined lower temperature limit suitable for charging the secondary battery at a high charging power greater than 18 kW, activate the electromagnetic energy generator and to generate and transmit the electromagnetic energy to the electric vehicle to cause the secondary battery to be heated. The control unit is further configured to, upon determining that the battery temperature of the secondary battery exceeds the lower temperature limit, activate the battery charging module to initiate charging the secondary battery at the high charging power.

In another aspect, a powering system for powering an electric vehicle comprises a secondary battery for powering an electric vehicle. The powering system additionally comprises a temperature sensing module configured to monitor a battery temperature of the secondary battery. The powering system additionally comprises an energy conversion module. The energy conversion module is configured to electromagnetically couple to an electromagnetic energy generator of a charging station and to receive electromagnetic energy therefrom by contactless energy transfer means, convert the electromagnetic energy into heat, and heat the secondary battery with the heat. The powering system further comprises a control unit. The control unit is configured to receive the battery temperature from the temperature sensing module and to communicate the battery temperature to a charging station through a communication interface. The control unit is additionally configured to, upon determining that the battery temperature of the secondary battery is below a predetermined lower temperature limit suitable for charging at a high charging power greater than 18 kW, activate the energy conversion module to receive the electromagnetic energy and to cause the secondary battery to be heated. The control unit is further configured to, upon determining that the battery temperature of the secondary battery exceeds the lower temperature limit of the secondary battery, activate the secondary battery to initiate charging the secondary battery at the high charging power.

In another aspect, an electric vehicle charging system comprises a powering system for powering an electric vehicle and an electric vehicle charging station. The powering system comprises a secondary battery for powering the electric vehicle, a temperature sensing module configured to monitor a battery temperature of the secondary battery. The powering system additionally includes an energy conversion module configured to receive electromagnetic energy by contactless energy transfer means, convert the electromagnetic energy to heat and heat the secondary battery. The powering system further comprises a control unit configured to receive the battery temperature from the temperature sensing module and to communicate the battery temperature to a charging station through a communication interface. The electric vehicle charging station comprises a battery charging module configured to provide charging energy to the secondary battery. The charging station additionally comprises an electromagnetic energy generator configured to generate and transfer the electromagnetic energy, by the contactless energy transfer means, to the energy conversion module. The charging station further comprises a control unit configured to, upon determining that the battery temperature is below a predetermined lower temperature limit suitable for charging the secondary battery at a high charging power greater than 18 kW, activate the electromagnetic energy generator and to generate and transmit the electromagnetic energy to the energy conversion module to cause the secondary battery to be heated. The control unit is further configured to, upon determining that the battery temperature of the secondary battery exceeds the lower temperature limit of the secondary battery, activate the battery charging module to initiate charging the secondary battery at the charging power greater than 18 kW.

DETAILED DESCRIPTION

Figure 1:
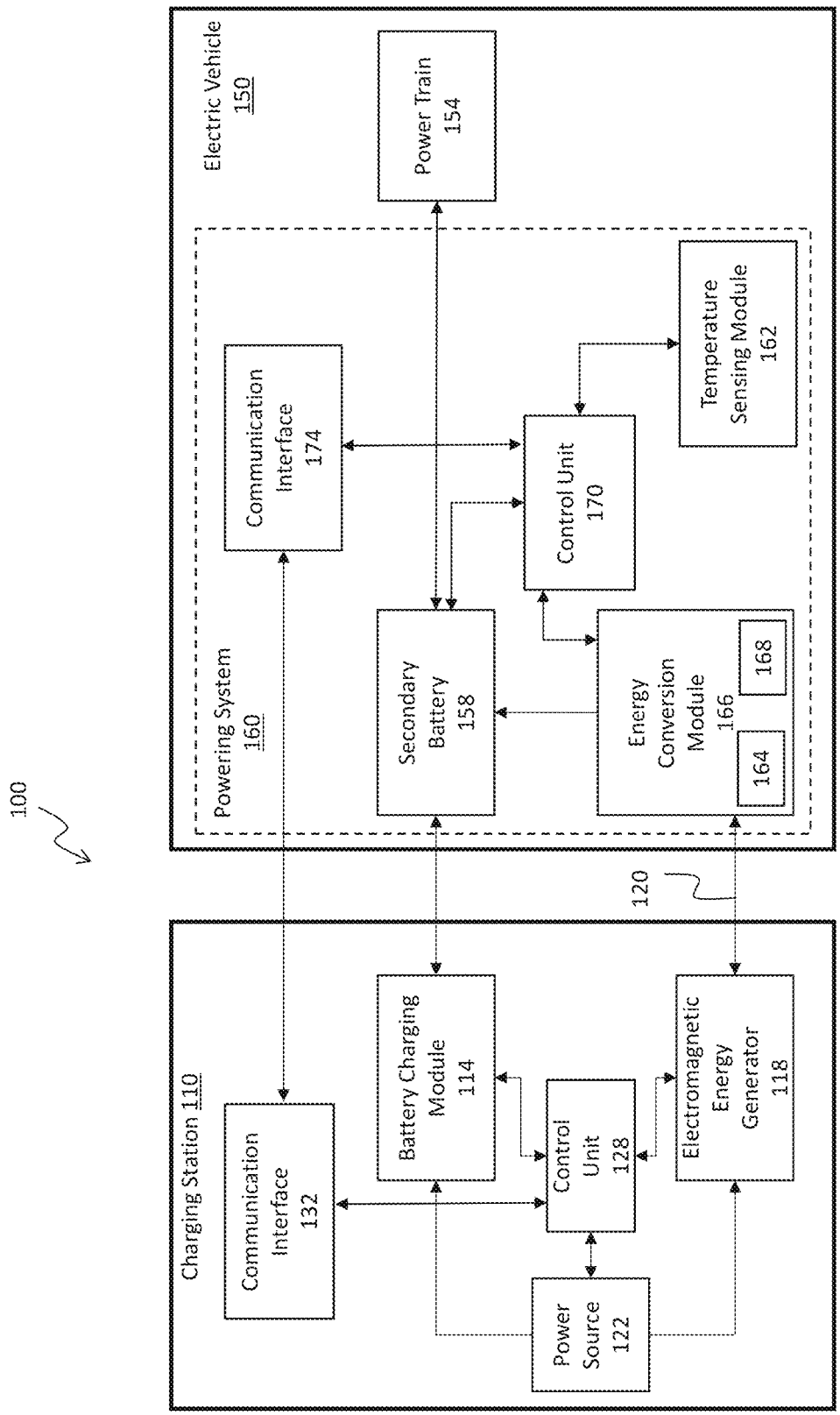
FIG. 1 illustrates an electric vehicle charging system configured for charging a secondary battery installed in an electric vehicle with battery temperature control using electromagnetic energy, according to various embodiments.

The modern automobile industry is undergoing a fundamental change with the explosive growth of electric vehicles. Improved stability, lower noise and eco-friendliness of electric vehicles are expected to solve or mitigate many problems traditionally associated with automobiles based on internal combustion engines. However, one of the biggest obstacles to the infrastructure of electric vehicles is the relatively long charging time. In contrast to refueling gasoline-based automobiles, which usually lasts around 15 minutes or less, charging time of electric vehicles can take much longer, e.g., as long as 10 hours, depending on, among other factors, the charge level of the battery, the charging technology used, the charging cable used and the charging station.

The international standard IEC 61851 classifies four different charging modes (IEC, 2003). For example, in North America, chargers are classified depending on the charge level. The slowest charge is from level 1 chargers. Using a charging current of about 12-16 amps and a charging power of about 1-3 kW and standard (110V) plug sockets, level 1 chargers can charge plug-in electric vehicles (PEVs) with 100 miles of range in more than 10 hours (h), e.g., around 24 h, and are mostly used for overnight charging at home. Using a charging current of about 16-40 amps and a charging power of about 1-7 kW, level 2 charging can charge a PEV with 100 miles of range in about 4-12 h. Using a charging power of up to about 43.5 kW, level 3 charging can charge a PEV with 100 miles of range in about 0.5 to ~1.5 h. Using a charging power of about 50-150 kW, level 4 charging can charge a PEV with 100 miles of range in less than 15 min. As used herein, fast charging refers to charging with a high charging power, e.g., a charging power substantially greater than that of level 2 charging.

While the availability of charging stations and fast charging technologies have made tremendous progress over the years, electric vehicle charging continues to suffer from some unique refueling challenges. One of the unique challenges relates to safety and reliability of some secondary batteries. While the refueling time for gasoline vehicles does not depend on the ambient temperature, the recharging time for electric vehicles may depend on or be limited by the ambient temperature. In particular, unlike gasoline refueling, the speed of charging Li-based secondary batteries may be severely limited at lower temperatures.

One problem recognized in the industry associated with charging Li-based secondary batteries at lower temperatures is lithium plating. Li plating refers to an undesirable side reaction on the anode side of Li-ion batteries where Li ions are reduced to metallic Li instead of intercalating into the anode crystal structure. Among other harmful effects, the metallic Li can form dendrites under some circumstances, which can severely degrade the performance and reliability of Li-ion batteries. Without being bound to any theory, Li plating can occur when the local anode potential drops below about 0 V vs. Li/Li+. The anodes of some Li-ion batteries contain graphite, which has an equilibrium potential within 100 mV vs. Li/Li$_+$. As a result, under certain circumstances, e.g., relatively low temperatures and high current, the large anode polarization can push graphite potential below the threshold for lithium plating in Li-ion batteries. In addition, various other characteristics of Li-ion batteries can contribute to Li-plating in Li-ion batteries. For example, Li plating can be exacerbated by the presence of local inhomogeneities at the graphite anode surface, relatively slow intercalation kinetics, relatively high solid electrolyte interface (SEI) film resistances in the anode, and slow lithium diffusion in the anode, to name a few contributing factors. Anode material type can also influence Li plating behavior due to the differences in equilibrium potential. Similarly, electrolyte composition can also affect the low-temperature performance of Li-ion batteries. While deposited metallic Li can be reversible by oxidation, during oxidation, Li dendrites can become disconnected from the active material, leading to "dead Li" in the cell. Furthermore, the plated metallic Li can be highly reactive and can form an irreversible SEI with the electrolyte.

These effects of Li plating can lead to a rapid reduction in battery cycle life and/or capacity, and can also pose significant safety hazards. The rapid performance reduction can be associated with, e.g., exponential dependence of various processes that affect Li-plating on temperature. It has been observed, e.g., that some secondary batteries including graphite/LiNi$_{1/3}$Mn$_{1/3}$Co$_{1/3}$O$_2$ cells can lose 75% capacity in 50 cycles with 1-C charge at 5° C., although the same cells can survive 4,000 cycles at 25° C. Similarly, in secondary batteries including graphite/LiFePO$_4$ cells, cell life at a temperature of 10° C. had been observed to be only about half of the cell life at 25° C. To prevent such degradation in the battery cycle life and/or capacity, the charging rate at lower temperatures may be significantly reduced, leading to increased charging time. In view of the fact that 47 out of 50 US states have an average temperature below 10° C. in winter, even when the availability of charging stations become as ubiquitous as gas stations, the performance and reliability degradation of Li-ion batteries at low temperatures may be a limiting factor in further commercialization of electric vehicles. To address these and other needs of performance, reliability and safety concerns related to fast charging at low temperatures, the disclosed technology relates to rapidly and efficiently heating the secondary battery to a safe temperature for fast charging prior to or during charging, and maintaining the battery temperature within a safe range during charging.

Electric Vehicle Charging Systems with Battery Temperature Control Using Electromagnetic Energy To reduce the various risks associated with charging a secondary battery of an electric vehicle at low temperatures including degradation of performance and/or cycle life of the secondary battery as described above, aspects of the disclosed technology relate to an electric vehicle charging system equipped with battery temperature control using electromagnetic energy. The charging system is configured to raise the temperature of the secondary battery to a temperature suitable for fast charging before initiating charging the secondary battery by transferring electromagnetic energy to the electric vehicle using contactless energy transfer means and converting the electromagnetic energy to heat for heating the secondary battery. Advantageously, the contactless energy transfer means enable localized heating of the secondary battery to ensure that the performance and/or reliability of the secondary battery is not compromised when the ambient temperature is relatively low.

FIG. 1 illustrates an electric vehicle charging system 100 configured for managing a temperature of a secondary battery installed in an electric vehicle before and/or during charging, according to embodiments. The electric vehicle charging system 100 includes a charging station 110 and an electric vehicle 150.

The electric vehicle 150 comprises a powering system 160 for powering the electric vehicle 150 through a power train 154. The powering system 160 comprises a secondary battery 158 for powering the electric vehicle 150 and a temperature sensing module 162 thermally coupled to the secondary battery 158. The temperature sensing module 162 includes a temperature sensor e.g., a thermocouple, a resistance temperature detector (RTD), a thermistor or a semiconductor-based integrated circuit, for monitoring a battery temperature of the secondary battery 158. The temperature sensing module 162 is configured to generate temperature data from monitoring the battery temperature. The temperature sensing module 162 may also store temperature data which may include historical temperature information.

The powering system 160 additionally comprises an energy conversion module 166 electrically and thermally coupled to the secondary battery 158. The energy conversion module 166 is configured to electromagnetically couple to an electromagnetic energy generator 118 of a charging station 110 and to receive electromagnetic energy 120 therefrom by contactless energy transfer means, convert the electromagnetic energy into heat, and heat the secondary battery with the heat.

The energy conversion module 166 may be in thermal communication with the secondary battery 158 in a number of ways to efficiently transfer heat therebetween. For example, the energy conversion module 166 may directly contact the secondary battery 158 or indirectly contact the secondary battery 158 through an efficient heat conducting medium such as a material having high thermal conductivity, e.g., a metal.

The powering system 160 additionally comprises a control unit 170 communicatively coupled to each component of the powering system 160. The control unit 170 comprises a processing logic device configured to execute various instructions for controlling various components of the powering system 160 as disclosed herein. The control unit 170 further comprises a memory and/or storage device having loaded thereon various instructions for providing control signals to various components of the powering system 160 as disclosed herein. The control unit 170 is electrically and communicatively coupled to the secondary battery 158, the temperature sensing module 162 and the energy conversion module 166. The control unit 170 is configured to receive the temperature data from the temperature sensing module 162 and to communicate the temperature data to the charging station 110 through a communication interface 174. The control unit 170 is additionally configured to receive the temperature data from the temperature sensing module 162 and to activate and deactivate the energy conversion module 166 for receiving the electromagnetic energy 120 by contactless energy transfer means from an electromagnetic energy generator 118 of the charging station 110, converting the electromagnetic energy to heat and transferring the heat to the secondary battery 158 to raise the temperature thereof. The energy conversion module 166 can be configured to transfer electromagnetic energy 120 by electromagnetic induction or microwave energy, as described with respect to FIGS. 1A-1D.

In some embodiments, the energy conversion module 166 may include separate components to perform its functions described above. In these embodiments, the energy conversion module 166 may include an energy receive module 164 configured to electromagnetically couple to the electromagnetic energy generator 118 of the charging station 110 without making physical contact thereto. The energy receive module 164 is configured to receive electromagnetic energy 120 from the electromagnetic energy generator 118 by contactless energy transfer means. The energy conversion module 166 may additionally include a heat generator 168 as a separate component from the energy receive module 164, which is configured to convert the electromagnetic energy into heat and to transfer the heat to the secondary battery 158 to raise the temperature thereof.

The control unit 170 is configured such that, upon determining that the battery temperature of the secondary battery 158 is below a predetermined lower temperature limit suitable for fast charging, e.g., charging at a charging rate greater than 18 kW, the control unit 170 may activate the energy conversion module 166 to receive the electromagnetic energy 120 from the electromagnetic energy generator 118 of the charging station 110, e.g., through the energy receive module 164, and to cause the secondary battery 158 to be heated using heat generated by the heat generator 168.

After heating, the control unit 170 is further configured to, upon determining that the battery temperature of the secondary battery 158 exceeds the lower temperature limit of the secondary battery, activate the secondary battery 158 to initiate fast charging the secondary battery 158, e.g., at the charging power greater than about 18 kW.

The control unit 170 is further configured for fast charging the secondary battery 158, e.g., at the charging power greater than about 18 kW, while maintaining the battery temperature between the lower temperature limit and an upper temperature limit at least in part by controlling a magnitude of the electromagnetic energy 120 converted into heat by the energy conversion module 166.

Still referring to FIG. 1, the charging station 110 comprises a battery charging module 114 configured to electrically connect and provide charging energy to the secondary battery 158. The charging station 110 additionally comprises an electromagnetic energy generator 118 configured to generate and transfer the electromagnetic energy 120, by contactless energy transfer means, to the energy conversion module 166. The battery charging module 114 and the electromagnetic energy generator 118 are each powered by a power source 122. The electromagnetic energy generator 118 can include one or more of an inductive energy generator or a microwave energy generator, as described infra with respect to FIGS. 1A-1D.

The charging station 110 additionally comprises a control unit 128 communicatively coupled to each component of the charging station 110. The control unit 128 comprises a processing logic device configured to execute various instructions for controlling various components of the charging station 110 as disclosed herein. The control unit 128 further comprises a memory and/or storage device having loaded thereon various instructions for providing control signals to various components of the charging station 110 as disclosed herein. The control unit 128 is configured to receive the temperature data from the control unit 170 of the powering system through a communication interface 132 communicatively coupled to the communication interface 174 of the powering system 160.

The control unit 128 is configured to, based on the temperature data, determine whether the battery temperature of a secondary battery is below a predetermined lower temperature limit suitable for fast charging, e.g., charging at a charging power greater than about 18 kW. The control unit 128 is further configured to, upon determining that the battery temperature is below the predetermined lower temperature limit, activate the electromagnetic energy generator 118 to generate and transmit the electromagnetic energy 120 to the energy conversion module 166 to cause the secondary battery 158 to be heated.

After heating, the control unit 128 is further configured to, upon determining that the battery temperature of the secondary battery 158 exceeds the lower temperature limit, activate the battery charging module 114 to initiate charging the secondary battery 158 at the fast charging rate, e.g., at a charging power greater than about 18 kW.

The control unit 128 is further configured for fast charging the secondary battery 158, e.g., at the charging power greater than about 18 kW, while maintaining the battery temperature between the lower temperature limit and an upper temperature limit at least in part by controlling a magnitude of the electromagnetic energy 120 generated and transferred by the electromagnetic energy generator 118.

Still referring to FIG. 1, the communication interfaces 132, 174 may be configured for wired or wireless communication utilizing any suitable protocol for carrying out the operations described herein, e.g., IEEE 802.11 protocols, Bluetooth, SPI (Serial Peripheral Interface), I$^2$C (Inter-Integrated Circuit), USB (Universal Serial Port), CAN (Controller Area Network), Modbus protocols, cellular data protocols (e.g. 3G, 4G, LTE, 5G), optical communication networks, Internet Service Providers (ISPs), a peer-to-peer network, a Local Area Network (LAN), a Wide Area Network (WAN), a public network (e.g. "the Internet"), a private network and a satellite network, to name a few.

The control units 128, 170 may include one or more logic devices including digital and/or analog circuitry, such as processors, microprocessors, multi-core processors, and/or field programmable gate arrays (FPGAs) to execute various operations disclosed herein. Furthermore, while not illustrated, the control units 128, 170 may include one or more memory and/or storage devices such as static random access memory device, a dynamic random access memory device, a non-volatile memory device and/or a disk drive. The memory and/or storage device store instructions to execute the various operations and/or store data.

According to various embodiments disclosed herein, the secondary battery 158 of the electric vehicle is a Li-ion battery. As described herein, Li-ion battery refers an energy storage device that rely on insertion reactions from both electrodes where lithium ions act as the charge carrier. According to various implementations, the Li-ion battery includes a negative electrode comprising, e.g., carbon (e.g., graphite) or lithium titanate ($Li_4Ti_5O_{12}$). The Li-ion battery additionally includes an electrolyte including, e.g., a mixture of lithium salts (e.g., $LiPF_6$) and an organic solvent (e.g., diethyl carbonate) to allow for ion transfer. A separating membrane is used to allow lithium ions to pass between the electrodes while preventing an internal short circuit. When operating as an energy source or discharge mode, electrons travel from the negative electrode to the positive electrode, and the $Li_+$ ions travel from the negative electrode through the electrolyte to the positive electrode to maintain electroneutrality. When the system is operated in charge mode the electron current and $Li_+$ ion flow is reversed.

According to various embodiments, the secondary battery 158 is configured such that fast charging at reduced temperatures can lead to significant probability of reduction of one or both of the battery capacity and cycle life. For example, the secondary battery 158 may be configured such that, relative to the cycle life and/or the capacity at 25° C., the corresponding cycle life and/or the capacity of the secondary battery 158 at reduced temperatures, reduces by more than 10%, 20%, 30%, 40%, 50% or a percentage in a range defined by any of these values at 20° C., more than 20%, 30%, 40%, 50%, 60% or a percentage in a range defined by any of these values at 15° C., more than 30%, 40%, 50%, 60%, 70% or a percentage in a range defined by any of these values at 10° C., more than 40%, 50%, 60%, 70%, 80% or a percentage in a range defined by any of these values at 5° C., and more than 50%, 60%, 70%, 80%, 90% or a percentage in a range defined by any of these values at 0° C. According to embodiments, the degradation of one or both of the battery capacity and/or the battery cycle life of the secondary battery may be associated with a risk of lithium plating in the secondary battery 158.

Still referring to FIG. 1, the electromagnetic energy generator 118 of the charging station 110 is configured to generate an electromagnetic energy 120 and to apply, by contactless energy transfer means, the electromagnetic energy 120 to the energy conversion module 166 of the powering system 160. The energy conversion module 166 is configured to convert the electromagnetic energy 120 to heat for heating the secondary battery 158. As described herein, the contactless energy transfer means includes means other than convection or conduction. The electromagnetic energy 120 comprises, according to embodiments, an inductive energy, a photon radiation energy, or a microwave energy.

FIGS. 1A-1D illustrate electric vehicle charging systems 100A, 100B, 100C, 100D each configured for electromagnetic energy transfer from a charging station to an electric vehicle for heating a secondary battery installed in the electric vehicle before and/or during charging, according to embodiments. The electric vehicle charging systems 100A, 100B, 100C, and 100D include electric vehicles 150A, 150B, 150C, and 150D, respectively, and different examples of the energy conversion module 166 described above with respect to FIG. 1. In the following, the electric vehicle charging systems 100A, 100B, 100C and 100D include analogous features as the electric vehicle charging system described above with respect to FIG. 1, the details of which are not repeated herein for brevity.

Figure 1A:
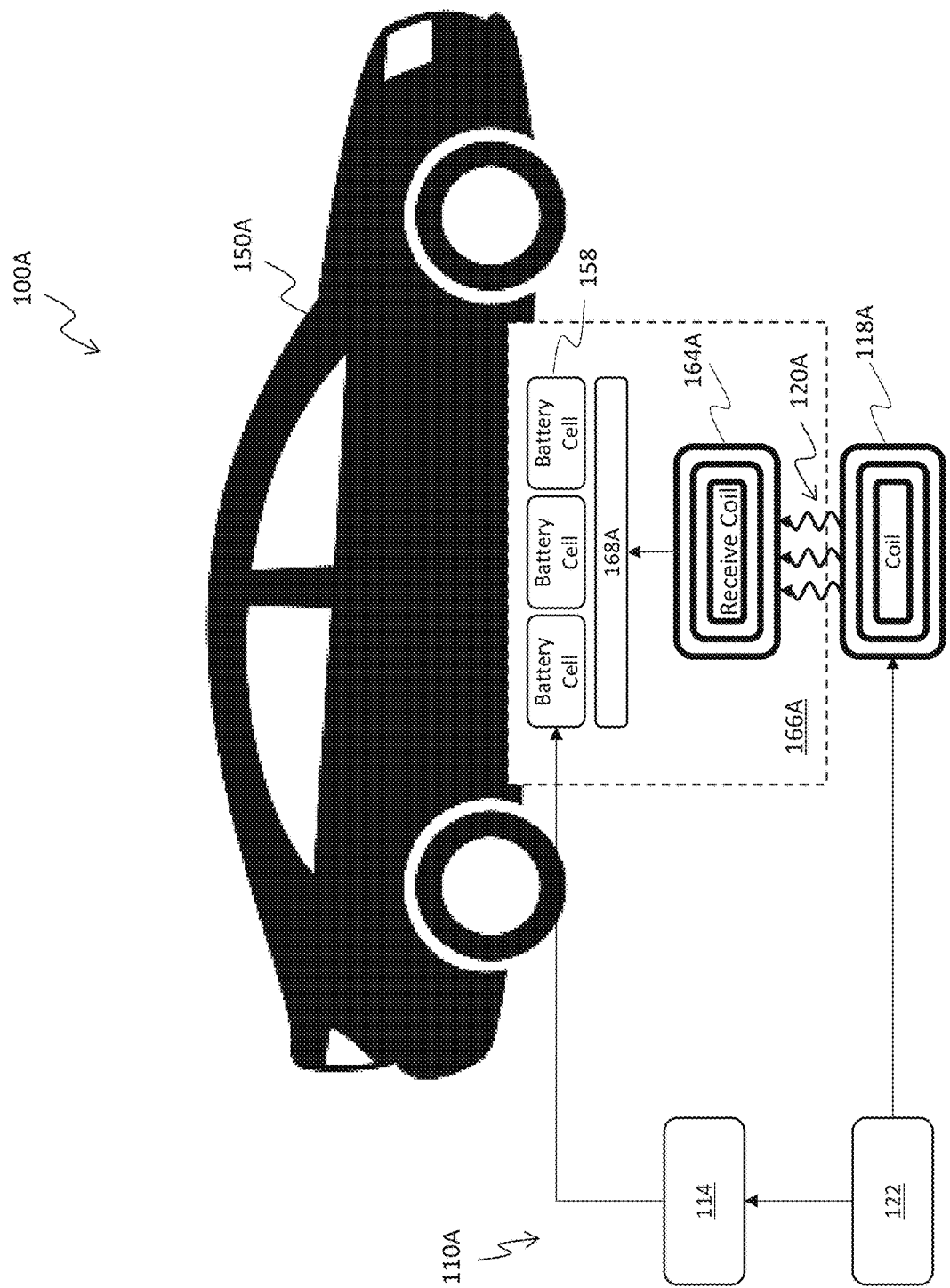
FIG. 1A illustrates an electric vehicle charging system in which electromagnetic energy is transferred from a charging station to an electric vehicle by electromagnetic induction to cause heating of a secondary battery, according to some embodiments.

FIG. 1A illustrates an electric vehicle charging system 100A in which electromagnetic energy 120A is transferred from a charging station 110A to an electric vehicle 150A by electromagnetic induction using a pair of induction coils to cause heating of a secondary battery, according to embodiments. The charging station 110A comprises an electromagnetic energy generator 118A including an energy transmit coil. The energy transmit coil may be electrically connected to and driven by a driver circuitry (not shown), which may in turn include an RF amplifier. The electromagnetic energy generator 118A is powered by the power source 122. The power source 122 also powers the battery charging module 114 in a similar manner as described above with respect to FIG. 1.

The electric vehicle 150A comprises an energy conversion module 166A. The energy conversion module 166A comprises an energy receive module 164A including an energy receive coil. The energy receive coil may be electrically connected to a rectifier and/or a power regulator. The energy conversion module 166A further comprises a heat generator 168A including a resistive heating element configured to convert the wireless energy received by the energy receive coil into heat energy, which is transferred to the secondary battery 158 by, e.g., conduction or convection through the heat generator 168A.

As illustrated, the vehicle charging system 100A is configured to heat the heat generator 168A using wireless energy transferred from the energy transmit coil to the energy receive coil. According to various embodiments, each of the energy transmit coil and the energy receive coil has a suitable number of windings and extend in a plane to occupy a suitable area. The energy transmit coil and the energy receive coil may substantially face each other, such that the planes in which the energy transmit coil and the energy receive coil extend form an angle less than about 60, 45, 30, 15 degrees, or a value in a range defined by any of these values. The energy transmit coil and the energy receive coil may substantially overlap each other, such that the projected areas of the energy transmit coil and the energy receive coil in the planes in which they extend overlap by more than 30, 45, 60, 75 percent, or a value in a range defined by any of these values.

It will be appreciated that the energy transmit coil and the energy receive coil are configured to transfer wireless energy therebetween for heating the secondary battery. In some embodiments, the energy transmit coil and the energy receive coil are dedicated for heating the secondary battery, and not configured for energy transfer for other purposes, e.g., charging the secondary battery 158.

Figure 1B:
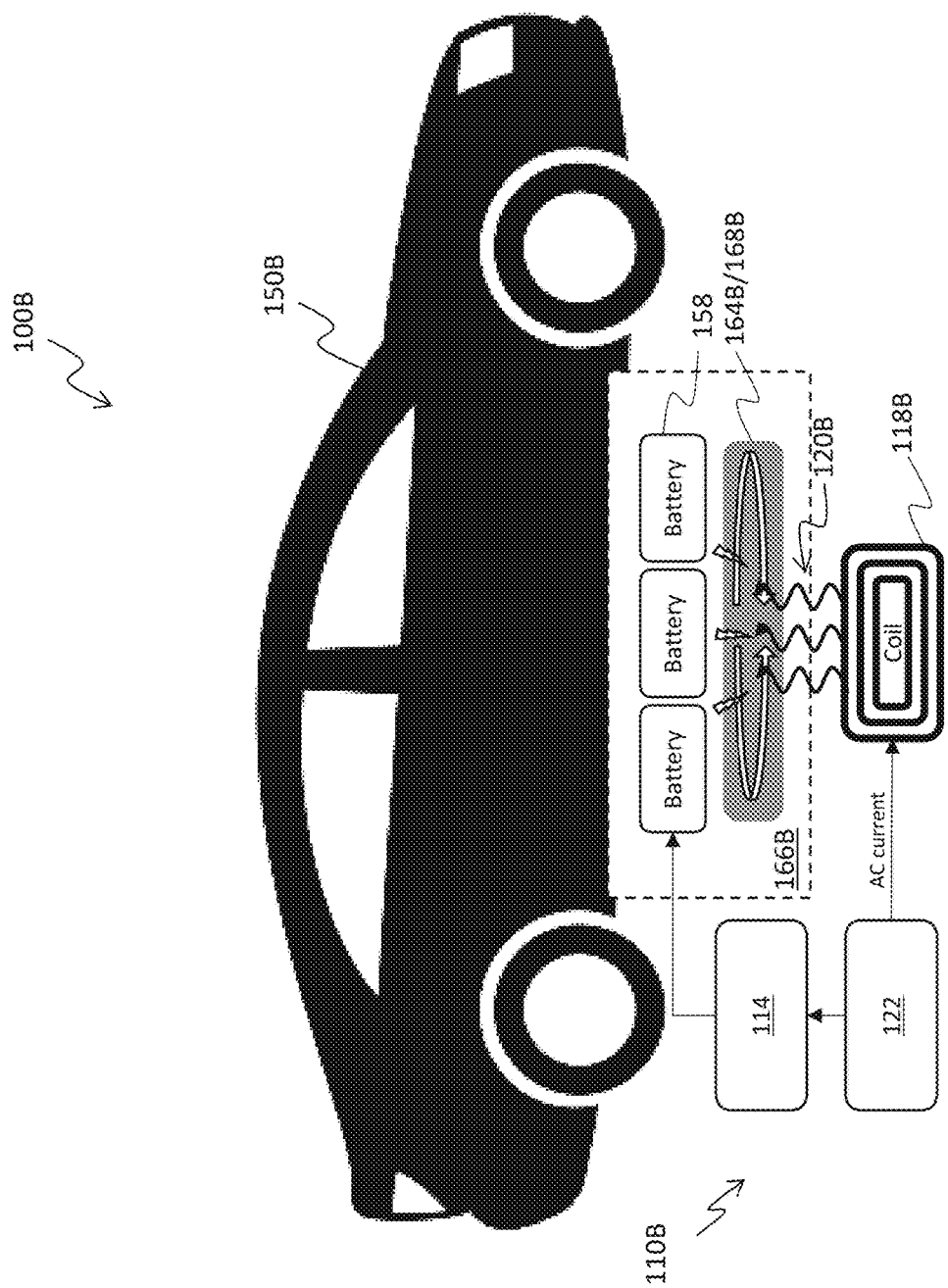
FIG. 1B illustrates an electric vehicle charging system in which electromagnetic energy is transferred from a charging station to an electric vehicle by electromagnetic induction to cause heating of a secondary battery, according to some other embodiments.

FIG. 1B illustrates an electric vehicle charging system 100B in which electromagnetic energy 120B is transferred from a charging station 110B to an electric vehicle 150B to cause heating of a secondary battery, according to embodiments. The charging station 110B comprises an electromagnetic energy generator 118B including an energy transmit coil. The energy transmit coil may be electrically connected by and driven by a driver circuitry (not shown), which may in turn include an RF amplifier. The electromagnetic energy generator 118B is powered by the power source 122. The power source 122 also powers the battery charging module 114 in a similar manner as described above with respect to FIG. 1.

The electric vehicle 150B comprises an energy conversion module 166B. The energy conversion module 166B comprises an energy receive module/heat generator 164B/168B including a conductor. The conductor may be placed adjacent to or within the energy transmit coil. The conductor of the energy receive module/heat generator 164B/168B is configured to convert the electromagnetic energy 120B from the energy transmit coil into eddy current flowing through the conductor, which is in turn converted into heat energy that is transferred to the secondary battery 158 by, e.g., conduction or convection.

As illustrated, the electric vehicle charging system 100B is configured for heating the secondary battery 158 by induction heating. As described herein, induction heating refers to an effect wherein an electric conductor is placed in the region of a time varying magnetic field, thereby inducing an electric current in the body. The electric current induced in the electric conductor in turn causes thermal power generation therein. In the illustrated electric vehicle charging system 100B, magnetic field is produced by a suitable arrangement of conductors in the electromagnetic energy generator 118B, e.g., an induction coil, connected to the power source 122 configured to provide the suitable time varying current, e.g., AC, in the induction coil. The electrical power supplied to the induction coil 118B is thus converted to thermal power in the electric conductor of the energy receive module/heat generator 164B/168B through the electromagnetic field, without the use of a physical connection between the electromagnetic energy generator 118B and the energy receive module/heat generator 164B/168B. The power sources 122 may provide an alternating current to the induction coil at a suitable frequency, depending on the configuration and the material of the conductor.

The induced eddy current intensity can be greater at the surface of the conductor and decrease towards its center as a function of a ratio between the thickness and skin depth of the conductor. As the ratio increases, a greater proportion of the total power is dissipated near the surface, according to a phenomenon referred to as the skin effect. The skin depth, $\delta$, can be expressed as $\delta = \sqrt{2\rho/\omega\mu}$, where $\rho$ is the electrical resistivity ($\Omega$ m), $\omega = 2\pi f$ (rad/s) is the angular frequency of the current in the induction coil and the absolute magnetic permeability $\mu$ is $\mu_r\mu_0$ where to $\mu_0 = 4\pi \cdot 10^{-7}$ (H/m). The amount of induced power is inversely proportional to the skin depth, and can thus be increased by selecting a material with relatively small skin depth.

According to embodiments, the material and the shape of the conductor can be optimized for power and efficiency of the electric vehicle charging system 100B. The conductor of the energy receive module/heat generator 164B/168B can have any suitable shape, e.g., a cylindrical rod or tube and a rectangular slab. Depending on the shape and the material of the conductor, the amount of induced power can be adjusted by adjusting a characteristic dimension of the conductor. For example, for a conductor having a cylindrical shape, the induced power can be proportional to the characteristic dimension of the diameter, and for a conductor having slab shape, the induced power can be proportional to the characteristic dimension of the thickness. On the one hand, the characteristic dimension can be increased to increase the induced power. However, the characteristic dimension may be limited such that the thermal mass is not too high, which can lower the efficiency. According to various embodiments, the a ratio of the characteristic dimension, e.g., diameter of a cylindrical conductor or thickness of a slab conductor, to the skin depth can exceed 1, 3, 5, 7 and 9, or have a value in a range defined by any of these values.

Figure 1C:
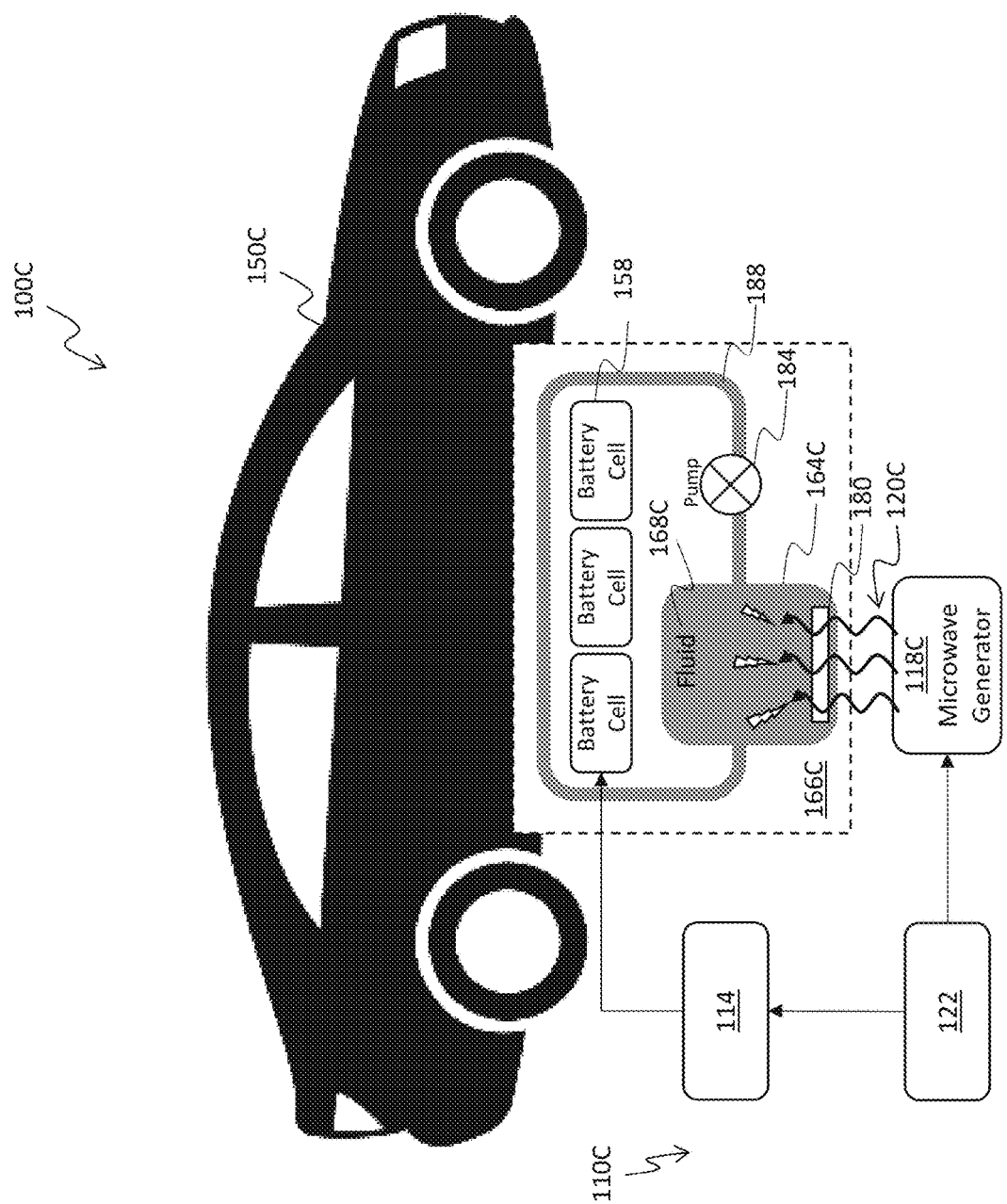
FIG. 1C illustrates an electric vehicle charging system in which electromagnetic energy is transferred from a charging station to an electric vehicle in the form of microwave energy to cause heating of a secondary battery, according to some other embodiments.

FIG. 1C illustrates an electric vehicle charging system 100C in which electromagnetic energy 120C is transferred from a charging station 110C to an electric vehicle 150C in the form of microwave energy to cause heating of a secondary battery, according to embodiments. The charging station 110C comprises an electromagnetic energy generator 118C including a microwave generator. The microwave generator is powered by the power source 122. The power source 122 also powers the battery charging module 114 in a similar manner as described above with respect to FIG. 1.

The electric vehicle 150C comprises an energy conversion module 166C. The energy conversion module 166C comprises an energy receive module 164A including a fluid reservoir having a microwave-transparent window 180 facing the microwave generator 118C to receive the microwave energy therethrough. The energy conversion module 166C additionally comprises a heat generator 168C comprising a fluid with high dissipation factor. The fluid reservoir is connected to a network of conduits 188 through which the fluid is circulated. The network of conduits 188 may include a pump 184 to aid in the circulation of the fluid. The fluid reservoir having the microwave-transparent window 180 is configured such that the fluid serving as the heat generator 168C contained in the fluid reservoir is heated by microwave energy from the microwave generator 118C.

The microwave transparent window 180 may be formed of a suitable microwave-transparent material such as quartz, polytetrafluoroethylene (PTFE) or the like.

The fluid serving the heat generator 168C has dielectric properties suitable for microwave heating with high efficiency. It will be appreciated that the capacity of the fluid to absorb microwave energy is related to the degree of penetration of microwaves in the fluid. When absorption occurs, the conversion of electromagnetic energy into heat depends on the relation between the dielectric loss factor ($\varepsilon''$) and the dielectric constant ($\varepsilon'$) for a given material. This relation is known as the dissipation factor (or loss tangent, tan δ). The higher the dissipation capacity for a fluid, the lesser will be the penetration of microwaves into the same sample. Thus, the ratio $\varepsilon''/\varepsilon'$ suggests the capability of each material to convert electromagnetic energy (microwaves) into heat at specific temperatures and frequencies. According to various embodiments, the fluid serving as heat generator 168C has tan δ equal or higher than that of water, e.g., higher than 0.157, 0.2, 0.4, 0.6, 0.8, 1.0, or a value in a range defined by any of these values, e.g., at 25° C. under microwave energy at 3 GHz.

Figure 1D:
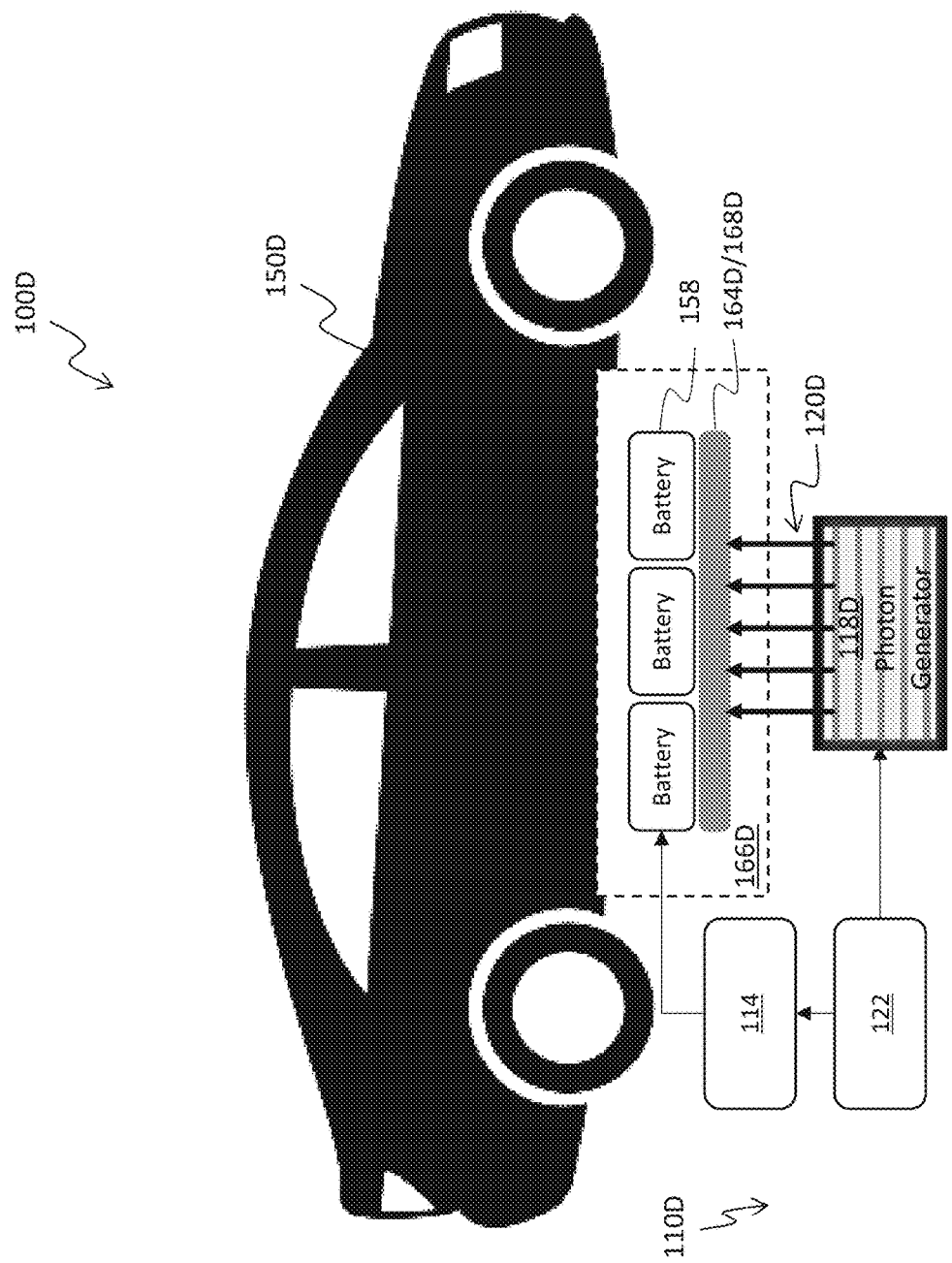
FIG. 1D illustrates an electric vehicle charging system in which electromagnetic energy is transferred from a charging station to an electric vehicle in the form of photon radiation energy to cause heating of a secondary battery, according to some other embodiments.

FIG. 1D illustrates an electric vehicle charging system 100D in which electromagnetic energy 120D is transferred from a charging station 110D to an electric vehicle 150D by photon radiation energy to cause heating of a secondary battery, according to embodiments. The charging station 110D comprises an electromagnetic energy generator 118D including a photon radiation generator. The photon radiation generator may be electrically connected to and driven by a driver circuitry (not shown) to control, e.g., intensity and duration. The electromagnetic energy generator 118D is powered by the power source 122. The power source 122 also powers the battery charging module 114 in a similar manner as described above with respect to FIG. 1.

The electric vehicle 150D comprises an energy conversion module 166D. The energy conversion module 166D comprises an energy receive module/heat generator 164D/168D including a photon absorber. The photon absorber of the energy receive module/heat generator 164D/168D is configured to convert the electromagnetic energy 120D in the form of photons into heat energy that is transferred to the secondary battery 158 by, e.g., conduction or convection. The photon absorber may have a suitable shape and/or be formed of a suitable material to efficiently absorb the photon radiation energy. For example, the photon absorber may have, e.g., a sheet or a slab structure as shown, to laterally overlap at least a portion of the secondary battery 158 and/or the photon radiation generator. Without being bound to any theory, the photon absorber may be formed of a material having optical levels, e.g., an energy gap, that is smaller than the energy of the photons such that electrons and/or holes can be excited to a higher energy level from a lower energy level, and upon de-excitation, be converted to phonons for generating heat.

The photon radiation generator may include a black body radiation element or a radiating element such as a metal wire, a metal filament, a carbon heating element, a quartz tungsten heating element, a ceramic heating element, a halogen lamp and the like. The radiating element may be configured to emit light in one or more of near infrared (NIR) range (e.g., 0.65-1.4 μm), short-wavelength infrared range (e.g., 1.4-3 μm), medium-wavelength infrared range (e.g., 3-8 μm), long-wavelength infrared range (8-15 μm) and and/or far infrared range. (e.g., 15-1000 μm).

Figure 1E:
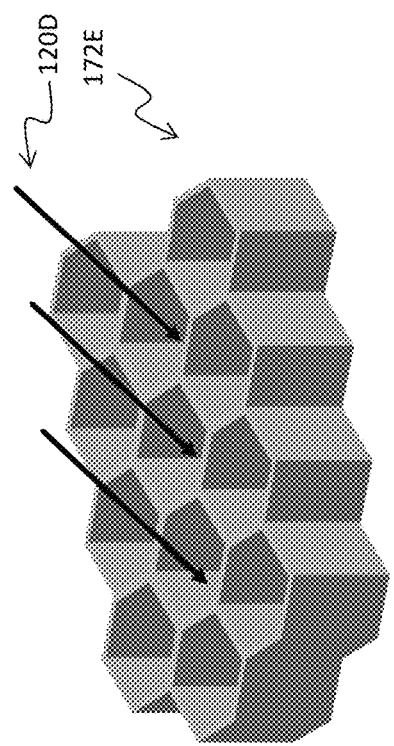
FIGS. 1E-1G illustrate enhanced photon absorbing structures facing a photon generator of the electric vehicle charging system of FIG. 1D, according to embodiments.
Figure 1F:
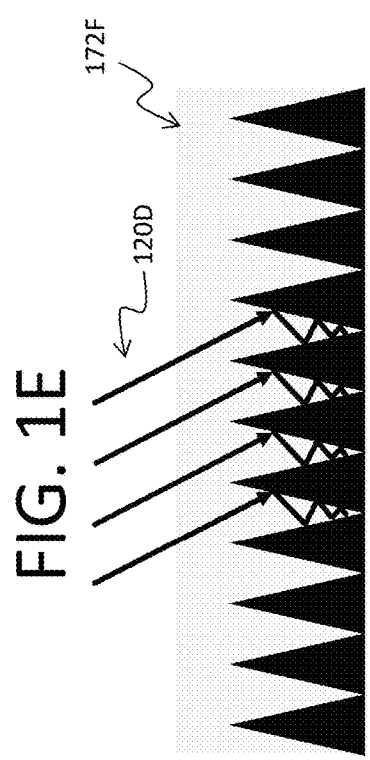
Figure 1G:
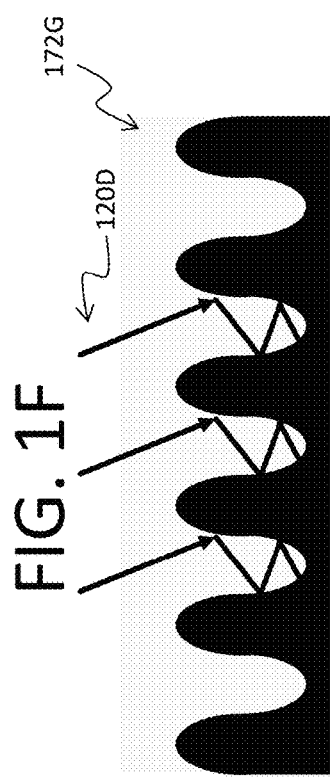

The photon absorber may comprise an enhanced photon absorbing structure, as exemplified by enhanced photon absorbing structures 172E, 172F and 172G illustrated in FIGS. 1E, 1F, and 1G, respectively. Each of the enhanced photon absorbing structures 172E, 172F and 172G may form at least part of or otherwise attached to the energy receive module/heat generator 164D/168D, and is configured to receive photon radiation from the photon radiation generator 118D, e.g., infrared photon radiation, by absorbing the photons from the photon radiation generator using an enhanced photon absorbing structure configured to reabsorb a substantial portion of photons that are reflected or scattered by the enhanced photon absorbing structure.

Referring to FIG. 1E, the enhanced photon absorbing structure 172E is configured for reabsorption of reflected photons using, e.g., a plurality of cavities, according to embodiments. The openings of the cavities face the photon radiation generator 118D. In the illustrated configuration, some of the rays of the photon radiation 120D that are incident on the enhanced photon absorbing structure 172E are incident at an angle such that, instead of being incident on the bottom surfaces of the cavities, the rays may be incident on a side wall thereof. Each of the cavities has sidewalls that are configured such that a substantial portion of photons that are reflected or scattered by one of the sidewalls is absorbed by another one of the sidewalls.

Referring to FIG. 1F, the enhanced photon absorbing structure 172F is configured for reabsorption of reflected photons using, e.g., a plurality of protrusions, according to embodiments. In the illustrated embodiment, the protrusions have faceted surfaces, where the sharpened ends of the protrusions face the photon radiation generator 118D. In the illustrated configuration, some of the rays of the photon radiation 120D that are incident on the enhanced photon absorbing structure 172F are incident at an angle such that, instead of being incident on the bottoms of the valleys, the rays may be incident on a side wall of the protrusions. Each of the protrusions has sidewalls that are configured such that a substantial portion of photons that are reflected or scattered by one of the sidewalls is absorbed by another one of the sidewalls.

Referring to FIG. 1G, the enhanced photon absorbing structure 172G is configured for reabsorption of reflected photons using, e.g., a plurality of protrusions, according to embodiments. The arrangement of the protrusions may be similar to that described above with respect to FIG. 1F except, instead of the protrusions having shaped ends, the protrusions of the photon absorbing structure 172G are rounded. The protrusions form a surface that undulate or vary sinusoidally in a lateral direction such that a substantial portion of photons that are reflected or scattered by a sidewall of one of the protrusions is absorbed by a sidewall of another one of the protrusions.

It will be appreciated that the configurations of the enhanced photon absorbing structures 172E, 172F and 172G are illustrated by way of example only, and various other configurations are possible. For example, while the enhanced photon absorbing structures 172E, 172F and 172G have the cavities or protrusions that form an array of cavities or protrusions, embodiments are not so limited, and the cavities or protrusions can have an irregular or random arrangement. Furthermore, while certain illustrative shapes of the cavities or protrusions are shown, it will be appreciated that various equivalent shapes are possible. For example, while the cavities of the photon absorbing structure 172E have a honeycomb shape including hexagonal openings, embodiments are not so limited. According to various embodiments, the cavities may form any suitable shape including any polygonal shape or a conic section.

Similarly, while the protrusions of the photon absorbing structures 172F, 172G have a faceted or sinusoidal shape when viewed in a cross section, embodiments are not so limited. According to various embodiments, the protrusions can have any suitable three-dimensional shape, including a cylinder, a cone, a pyramid, a prism, a polyhedron and a spheroid, to name a few.

Still referring to FIGS. 1E, 1F and 1G, it will be appreciated that the cavities or protrusions can have suitable dimensions such that photon radiation 120D having a wavelength can be reflected by a sidewall as discussed above. For example, the opening of the cavities or inter-protrusion spaces can be at least greater than an average or peak wavelength of the photon radiation 120, e.g., greater than 0.5 μm, 1 μm, 5 μm, 10 μm, 50 μm, 100 μm, 500 μm, 1 mm, 5 mm, 10 mm, 50 mm, 100 mm, or a value in a range defined by any of these values.

Referring to FIGS. 1A-1D, at least the electromagnetic generator 118A, 118B, 118C, 118D may be installed as part of a residential or commercial charging station. As illustrated, at least the electromagnetic generator 118A, 118B, 118C, 118D may be installed at or below the floor of the charging station over which the electric vehicle is placed during charging of the battery. In addition, the energy conversion module 166A, 166B, 166C, 166D may be disposed at a bottom of the electric vehicle to face the electromagnetic generator 118A, 118B, 118C, 118D. Thus configured, the electromagnetic generator 118A, 118B, 118C, 118D may be configured to, via contactless energy transfer means, transfer electromagnetic energy to the energy conversion module 166A, 166B, 166C, 166D of the electric vehicle, to provide heat to the secondary battery 158. In some configurations, the secondary battery 158 may also be located at a bottom of the electric vehicle for rapid heat transfer from the energy conversion module 166A, 166B, 166C, 166D to the secondary battery 158.

Figure 2A:
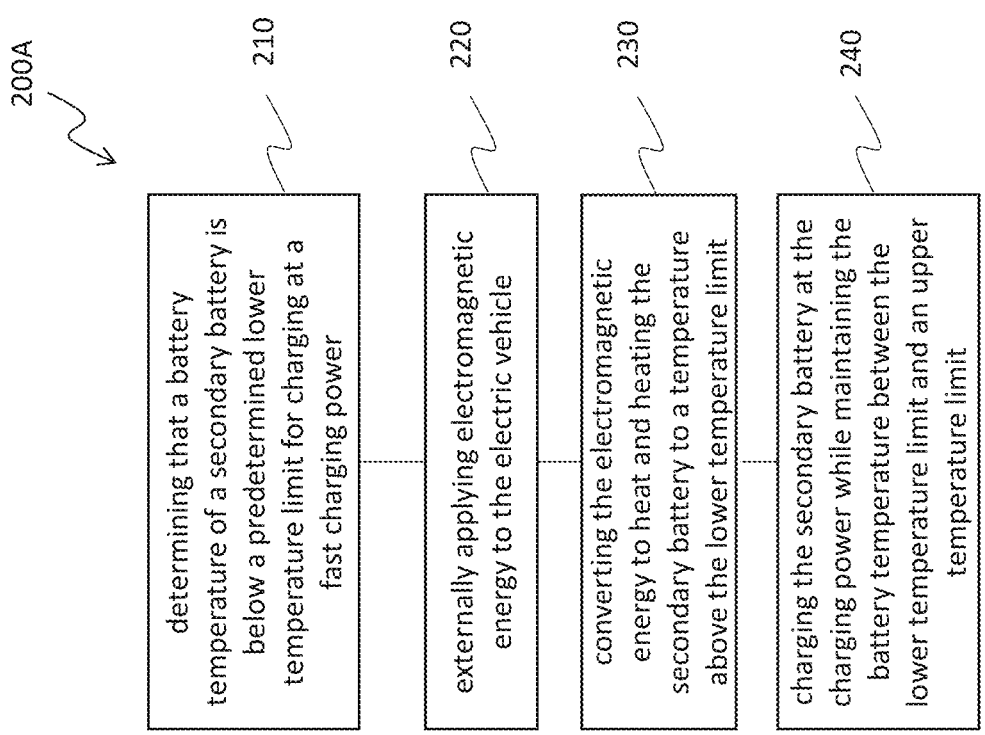
FIG. 2A illustrates a method of charging a secondary battery of an electric vehicle with battery temperature control using electromagnetic energy, according to various embodiments.
Figure 2B:
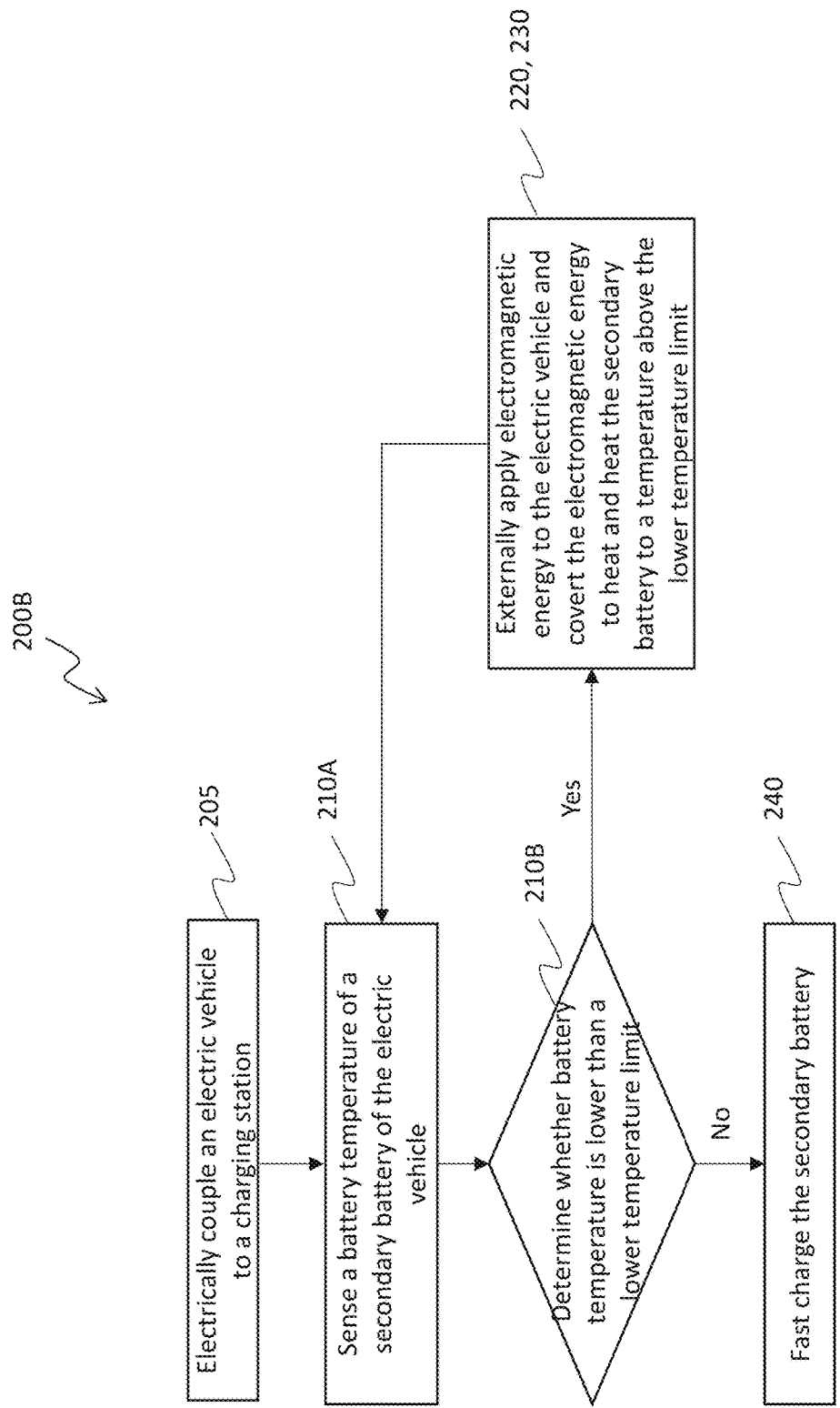
FIG. 2B illustrates a flow chart illustrating a method of charging a secondary battery of an electric vehicle with battery temperature control using electromagnetic energy, according to some embodiments.

As configured, according to various embodiments, the electromagnetic generator 118 and the energy conversion module 166 are efficiently coupled to provide targeted and localized heating to the secondary battery 158 compared to, e.g., conductive or convective means that directly provide heat to the secondary battery 158 from outside the electric vehicle 150. The targeted heating can provide energy efficiency and the localized heating can be advantageous to prevent undesirable heating of parts other than the secondary battery 158. FIGS. 2A and 2B illustrate methods 200A, 200B of charging a secondary battery of an electric vehicle, according to embodiments. The method 200A is similar to the method 200B, but the method 200B is illustrated in a decision tree format. The methods 200A, 200B can be implemented using any of the electric vehicle charging systems described above with respect to FIGS. 1 and 1A-1D. The methods 200A, 200B according to various embodiments comprises electrically coupling 205 (FIG. 2B) an electric vehicle to a charging station. Electrically coupling 205 may include plugging in a secondary battery 158 of the electric vehicle 150 to a battery charging module 114 of the charging station 110, as described above with respect to FIG. 1. Electrically coupling 205 may additionally include establishing a communication link between the communication interfaces 132 and 174 to communicatively couple the electric vehicle 150 with the charging station 110 to transmit control and data signals, e.g., temperature data, as illustrated in FIG. 1.

After electrically coupling 205 (FIG. 2B), the methods 200A, 200B proceeds to determining 210 (FIG. 2A) that a battery temperature of a secondary battery is below a predetermined lower temperature limit suitable for fast charging at a fast charging power such as, e.g., about 18 kW. In some embodiments, determining 210 (FIG. 2A) comprises sensing 210A (FIG. 2B) the battery temperature using the temperature sensing module 162 (FIG. 1) and comparing the battery temperature against a predetermined lower temperature limit using the control unit 170 of the electric vehicle (FIG. 1). In some other embodiments, determining 210 (FIG. 2A) comprises sensing 210A (FIG. 2B) the battery temperature using the temperature sensing module 162 (FIG. 1) and comparing the battery temperature against a predetermined lower temperature limit using the control unit 128 (FIG. 1) of the charging station 110. The predetermined lower temperature limit, which may be stored in a memory and/or storage device of the control unit 128 and/or the control unit 170, can be the lowest temperature limit that has been predetermined, e.g., based on the battery manufacturer's specification, to be suitable for charging at a fast charging power, e.g., at a charging power greater than 18 kW, which value may be stored in a memory device.

Upon determining that the battery temperature is below the lower temperature limit, the methods 200A/200B proceeds to externally apply 220, by contactless energy transfer means using the electromagnetic energy generator 118 of the charging station 110 (FIG. 1), electromagnetic energy to an energy conversion module 166 (FIG. 1) of the electric vehicle 160.

The methods 200A/200B further proceeds to convert 230 the electromagnetic energy to heat, and to heat the secondary battery to a temperature above the lower temperature limit for fast charging. The methods 200A/200B further comprises charging 240 the secondary battery at the charging rate while maintaining the battery temperature between the lower temperature limit and an upper temperature limit at least in part by controlling a magnitude of the electromagnetic energy transferred by the contactless energy transfer means.

Still referring to FIG. 2A, according to embodiments, determining 210 that a battery temperature is below a predetermined lower temperature limit suitable for charging at a fast charging rate comprises obtaining temperature data from the secondary battery 158 (FIG. 1) using the temperature sensing module 162 (FIG. 1). The temperature data may be communicated to one or both of the control unit 128 and control unit 170 (FIG. 1) for determining that the battery temperature is below a predetermined lower temperature limit. The lower temperature limit may be a temperature at which one or both of a battery capacity and/or a battery cycle life of the secondary battery drops by more than 30%. 40%, 50%, 60%, 70% or a value in a range defined by any of these values, compared to a corresponding battery capacity and/or a corresponding battery cycle life of the secondary battery at 25° C. The lower temperature limit can be a temperature lower than 20° C., 15° C., 10° C., 5° C., 0° C., –5° C., –10° C., –15° C., –20° C., or a temperature in range defined by any of these values.

According to embodiments, determining 210 that a battery temperature is below a predetermined lower temperature limit suitable for charging at a fast charging rate or a high charging power comprises determining that the battery temperature is suitable for charging in a fast charging mode that is at or substantially higher than level 2 charging described above. It will be appreciated that fast charging or high charging power in the context of the disclosed technology can be associated with an elevated risk of Li plating as disclosed above, which risk can be elevated when the secondary battery is charged at a temperature lower than a predetermined lower temperature limit prescribed for the secondary battery. The predetermined lower temperature limit corresponds to a temperature at which, when the secondary battery is charged at a high charging power as described herein, one or both of a battery capacity and/or a battery cycle life of the secondary battery can drop by, e.g., 10% or more compared to a corresponding battery capacity and/or a corresponding battery cycle life of the same or comparable secondary battery at 25° C. The fast charging rate or high charging power can be defined in one of several ways, including by charging power, charging time, charging current and/or C-rate, to name a few. For example, for a standard charging power of about 6 kW within level 2 charging as of the time of the disclosure, a high charging power can be about 3 times or greater relative to the standard charging power, e.g., about 18 kW. However, it will be understood that as the battery technology evolves, this value can change. For example, the fast charging rate corresponds to a charging power sufficient for charging a secondary battery of an electric vehicle, e.g., with 100 miles of range or greater, to at least 50% of full capacity from less than 10% of full capacity, or alternatively 80% of full capacity from less than 50% of full capacity. in less than 10 hours, 8 hours, 6 hours, 4 hours, 2 hours, 1 hour, 0.5 hour, 0.25 hour, 0.1 hour or a value in a range defined by any of these values, at charging power exceeding 18 kW, 20 kW, 50 kW, 100 kW, 150 kW, 200 kW, 250 kW or a value in a range defined by any of these values. The secondary batteries according to embodiments can have a 100% capacity exceeding 10 kWh, 100 kWh, 200 kWh, 500 kWh, 1000 kWh, or a value in a range defined by any of these values. Alternatively, the fast charging rate corresponds to a C rate greater than 0.5C 1C, 2C, 5C, 10C or a value in a range defined by any of these values.

Still referring to FIG. 2A and FIG. 2B, upon determining 210/210B that the battery is temperature is higher than the predetermined lower temperature limit, the method 200A/200B proceeds to fast charge the secondary battery at the fast charging power.

On the other hand, upon determining 210 (FIG. 2A)/210B (FIG. 2B) that the battery is temperature is below the predetermined lower temperature limit, the control unit 128 of the charging station 110 (FIG. 1) activates the electromagnetic generator 118 (FIG. 1) for externally applying 220, by contactless energy transfer means, electromagnetic energy 120 (FIG. 1) to an energy conversion module 166 (FIG. 1) of the electric vehicle 150 (FIG. 1). In addition, the control unit 170 (FIG. 1) of the electric vehicle 150 (FIG. 1) activates the energy conversion module 166 for converting 230 the electromagnetic energy to heat and heating the secondary battery to a temperature above the lower temperature limit.

Externally applying 220 the electromagnetic energy and converting 230 the electromagnetic energy can be performed using any of the examples of electromagnetic generator 118 and energy conversion module 166 described herein with respect to FIGS. 1A-1D.

According to embodiments using the electric vehicle charging system 100A described above with respect to FIG. 1A, applying 220 the electromagnetic energy comprises supplying power from the power source 122 (FIG. 1A) to activate the energy transmit coil of electromagnetic energy generator 118A (FIG. 1A), thereby flowing AC current therethrough. The AC current flowing through the energy transmit coil creates an electromagnetic field (a changing magnetic field) around the energy transmit coil. In these embodiments, converting 230 the electromagnetic energy comprises, when the energy receive coil of the energy receive module 164A is in sufficient proximity to the energy transmit coil of the electromagnetic energy generator, generating an electric current within the energy receive coil. The AC flowing through the energy receive coil may be converted into DC by circuitry of the energy conversion module 166A (FIG. 1A). The DC generated is then used to generate heat using a resistive heating element of the heat generator 168A. However, embodiments are not so limited, and the AC may directly be used to generate the heat.

According to embodiments of using the electric vehicle charging system 100B described above with respect to FIG. 1B, applying 220 the electromagnetic energy comprises supplying power from the power source 122 (FIG. 1B) to activate the energy transmit coil, thereby flowing AC current therethrough. The AC current flowing through the energy transmit coil creates an eddy current within the conductor of the energy receive module/heat generator 164B/168B. In these embodiments, converting 230 the electromagnetic energy comprises, when the AC current is applied though the transmit coil, generating an eddy current within the conductor disposed within the energy transmit coil. The power dissipated by the eddy current is dissipated as heat for heating the secondary battery 158A.

According to embodiments using the electric vehicle charging system 100C described above with respect to FIG. 1C, applying 220 the electromagnetic energy comprises supplying power from the power source 122 (FIG. 1C) to activate the microwave generator of the electromagnetic energy generator 118C (FIG. 1C), thereby transmitting the microwave energy 120C (FIG. 1C) through the microwave-transparent window 180 (FIG. 1C). In these embodiments, converting 230 the electromagnetic energy comprises, upon absorbing the microwave energy transmitted through the microwave-transparent window 180, generating heat in the high dissipation factor fluid serving as the heat generator 168C contained in the fluid reservoir of the energy receive module 164C (FIG. 1C). Thus heated fluid is circulated through the conduits 188 to transfer heat to the secondary battery 158.

According to embodiments using the electric vehicle charging system 100D described above with respect to FIG. 1D, applying 220 the electromagnetic energy comprises supplying power from the power source 122 (FIG. 1D) to activate the photon radiation energy generator of the electromagnetic energy generator 118D (FIG. 1D), thereby transmitting the photon radiation energy 120D (FIG. 1D) to the energy conversion module 166D including a photon absorber. The photon absorber can include any one of enhanced photon absorbing structures described above with respect to FIGS. 1E-1G. In these embodiments, converting 230 the electromagnetic energy comprises, upon absorbing the photon radiation energy using a photon absorber, generating heat in the photon absorber of the energy conversion module 166D (FIG. 1D). Thus heated photon absorber transfers heat to the secondary battery 158.

As illustrated in FIG. 2B, process of externally applying 220 the electromagnetic energy and converting 230 the electromagnetic energy to heat for heating the secondary battery may be part of a feedback process loop including sensing whether the battery temperature of the secondary battery has reached a temperature above the predetermined lower temperature limit suitable for fast charging after applying 220 the electromagnetic energy and converting 230 the electromagnetic energy. Referring to FIGS. 2A and 2B, upon determining 210/210B that the battery temperature is higher than the predetermined lower temperature limit, with or without heating the secondary battery as described above, the method 200A/200B proceeds to fast charge 240 the secondary battery at the fast charging power while maintaining the battery temperature between the lower temperature limit and an upper temperature limit at least in part by controlling a magnitude of the electromagnetic energy transferred by the contactless energy transfer means. The upper temperature limit may correspond to a temperature above which the secondary battery can suffer from harmful effects, such as electrolyte decomposition and cathode dissolution. According to embodiments, the upper temperature limit can be less than 70° C., 60° C., 50° C., or a value in a range defined by any of these values.

In some embodiments, maintaining the battery temperature comprises actively cooling the secondary battery when the battery temperature exceeds the upper temperature limit. In these embodiments, the charging system comprises a cooling means for cooling the secondary battery. In some embodiments, the charging system includes non-contacting cooling means such as a cooling fan. In some embodiments, the cooling means may include contact cooling means configured to cool the secondary battery, such that the secondary battery is configured to be water-cooled, oil-cooled, air-cooled, or piezo-electric-cooled by the cooling means.

Figure 2C:
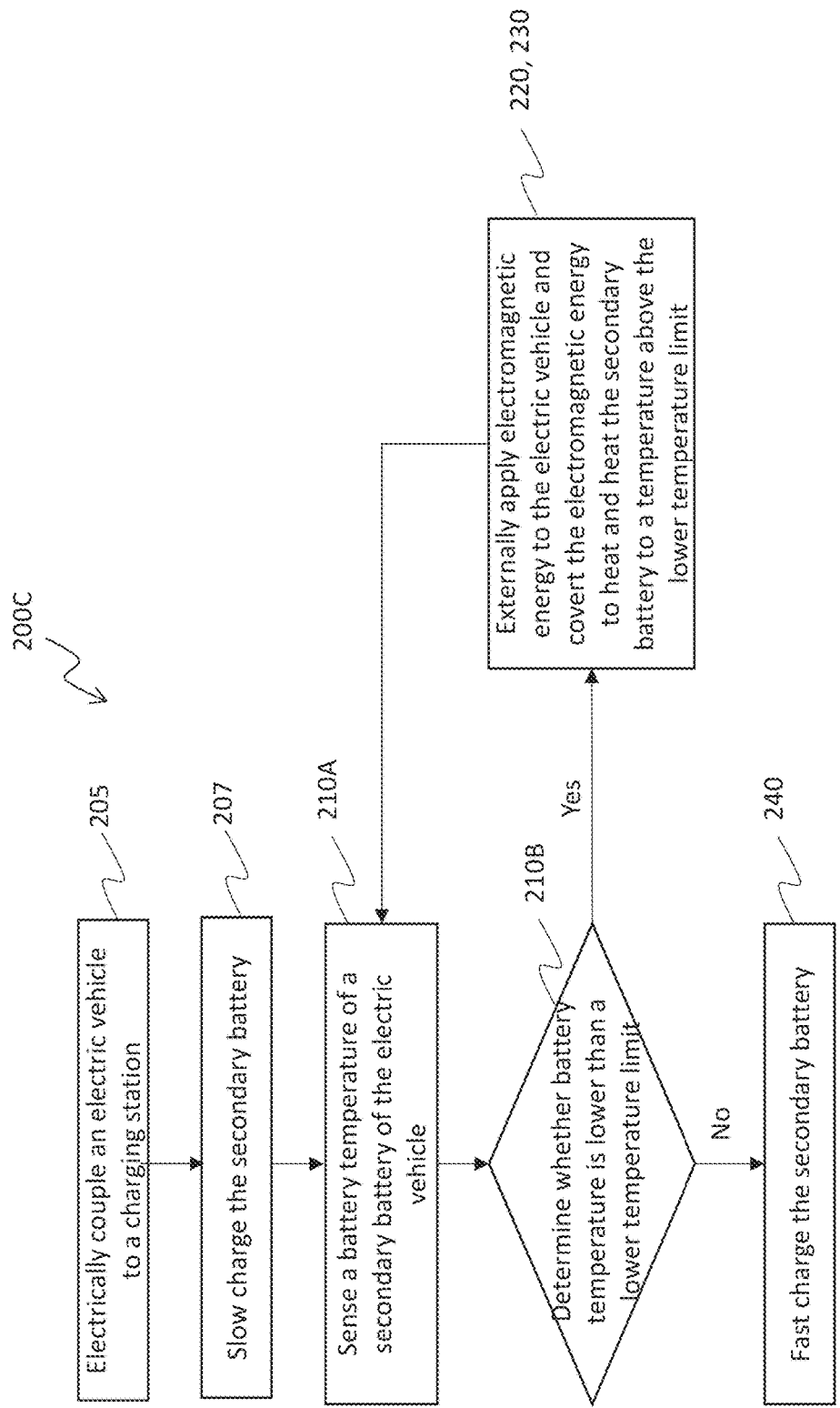
FIG. 2C illustrates a flow chart illustrating a method of charging a secondary battery of an electric vehicle with battery temperature control using electromagnetic energy, according to some other embodiments.
Figure 2D:
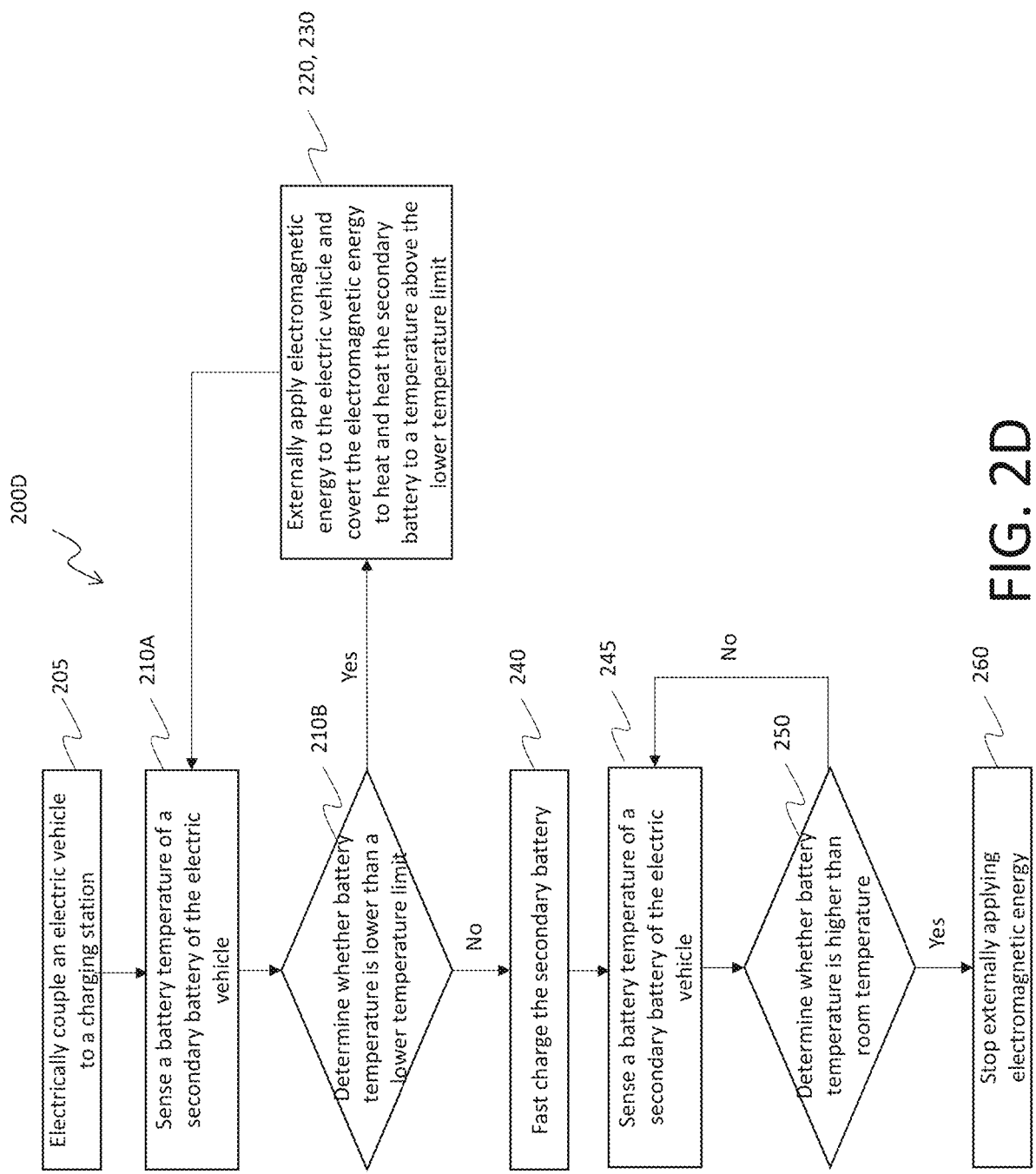
FIG. 2D illustrates a flow chart illustrating a method of charging a secondary battery of an electric vehicle with battery temperature control using electromagnetic energy, according to some other embodiments.
Figure 2E:
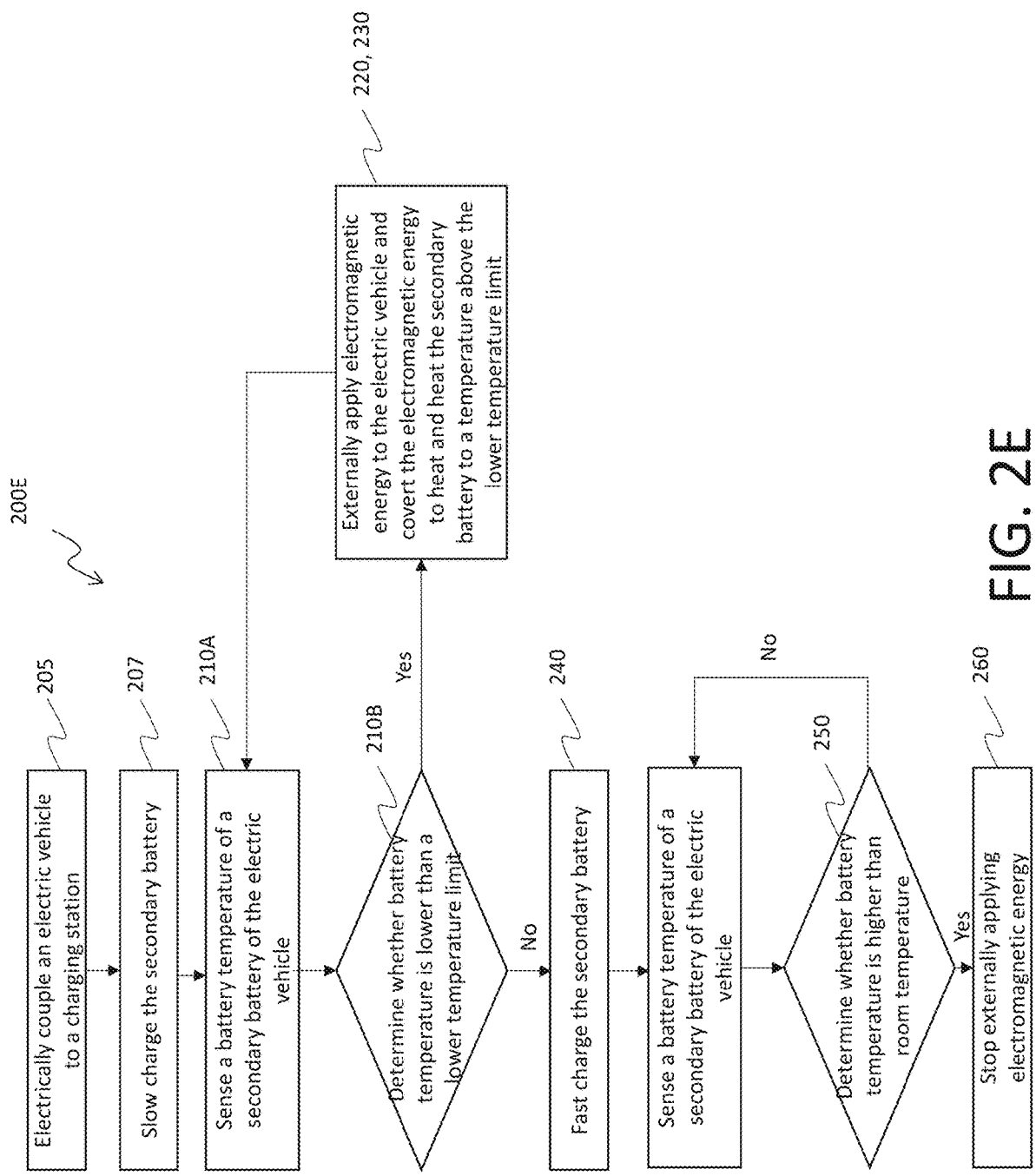
FIG. 2E illustrates a flow chart illustrating a method of charging a secondary battery of an electric vehicle with battery temperature control using electromagnetic energy, according to some other embodiments.

FIGS. 2C-2E illustrate flow charts illustrating alternative methods of charging a secondary battery of an electric vehicle with battery temperature control using electromagnetic energy, according to some other embodiments.

The method 200C of FIG. 2C provides a method of additionally accelerating the overall charging speed relative to the method 200B described above with respect to FIG. 2B by initiating charging at a slow charging rate before proceeding with the method 200B. The method 200C of FIG. 2C is the same as the method 200B described above with respect to FIG. 2B except, prior to sensing the battery temperature 210A, the method 200C additionally includes slow charging 207 the secondary battery at lower charging power. That is, before or during externally applying 220 the electromagnetic energy to heat the secondary battery to the temperature above the lower temperature limit, the secondary battery is slow charged. The slow charging 207 can be performed at a charging power lower than a fast charging power described herein, e.g., lower than 18 kW, e.g., any power at level 2 charging or lower. In some embodiments, the rate of the slow charging 207 can be a predetermined rate which may be relatively constant. In some other embodiments, the rate of slow charging 207 can be dynamically adjusted during the slow charging 207 based on the state of charge of the secondary battery. For example, the rate of slow charging 207 can be dynamically adjusted in inverse proportion to the state of charge. The inverse proportion may be linear or superlinear, e.g., exponential. In some embodiments, each of externally applying 220 (FIG. 2A) electromagnetic energy to the electric vehicle and converting 230 (FIG. 2A) the electromagnetic energy can be performed in conjunction with slow charging, until the battery temperature reaches the predetermined lower temperature limit. Thereafter, the method 200C proceeds to charging the secondary battery at the fast charging power, as described above with respect to FIGS. 2A and 2B.

The method 200D of FIG. 2D provides a method of maintaining the battery temperature after initiating charging 240 at the high charging power according to the method 200B described above with respect to FIG. 2B by stopping providing heat to the secondary battery once the battery temperature reaches a room temperature. The method 200D of FIG. 2D is the same as the method 200B described above with respect to FIG. 2B except, after commencing fast charging 240 the secondary battery, the method 200D additionally includes further sensing 245 the battery temperature to determine 250 whether the secondary battery temperature has reached a temperature higher than room temperature (25° C.). Upon determining 250 that the battery temperature has reached a temperature higher than room temperature, further heating the secondary battery is stopped by stopping 260 externally applying electromagnetic energy to the electric vehicle. Each of further sensing 245 the battery temperature and determining 250 whether the secondary battery temperature has reached a temperature higher than room temperature is performed in conjunction with fast charging 240.

The method 200E of FIG. 2E combines the method 200C of FIG. 2C and the method 200D of FIG. 2D. That is, the method 200E of FIG. 2E includes, prior to sensing the battery temperature 210A, slow charging 207 the secondary battery at lower charging power. The method 200E additionally includes, after commencing fast charging 240 the secondary battery, further sensing 245 the battery temperature to determine 250 whether the secondary battery temperature has reached a temperature higher than room temperature (25° C.), and upon determining 250 that the battery temperature has reached a temperature higher than room temperature, stopping further heating the secondary battery by stopping 260 externally applying electromagnetic energy to the electric vehicle.

Unless the context clearly requires otherwise, throughout the description and the claims, the words "comprise," "comprising," "include," "including" and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number, respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "may," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or whether these features, elements and/or states are included or are to be performed in any particular embodiment.

While certain embodiments have been described, these embodiments have been presented by way of example only, and are not intended to limit the scope of the disclosure. Indeed, the novel apparatus, methods, and systems described herein may be embodied in a variety of other forms; furthermore, various omissions, substitutions and changes in the form of the methods and systems described herein may be made without departing from the spirit of the disclosure. For example, while blocks are presented in a given arrangement, alternative embodiments may perform similar functionalities with different components and/or circuit topologies, and some blocks may be deleted, moved, added, subdivided, combined, and/or modified. Each of these blocks may be implemented in a variety of different ways. Any suitable combination of the elements and acts of the various embodiments described above can be combined to provide further embodiments. The various features and processes described above may be implemented independently of one another, or may be combined in various ways. All possible combinations and subcombinations of features of this disclosure are intended to fall within the scope of this disclosure.

What is claimed is:

1. A method of charging a battery of an electric vehicle, the method comprising:
    determining that a battery temperature of a secondary battery is below a predetermined lower temperature limit suitable for charging the secondary battery at a high charging power greater than about 18 kW;
    externally applying, by contactless energy transfer means, electromagnetic energy to the electric vehicle;
    converting the electromagnetic energy to heat and heating the secondary battery to a temperature above the lower temperature limit; and
    charging the secondary battery at the high charging power while maintaining the battery temperature between the lower temperature limit and an upper temperature limit at least in part by controlling a magnitude of the electromagnetic energy.

2. The method of claim 1, wherein the lower temperature limit corresponds to a temperature at which one or both of a battery capacity and/or a battery cycle life of the secondary battery drops by 50% or more compared to a corresponding battery capacity and/or a corresponding battery cycle life of the secondary battery at 25° C.

3. The method of claim 2, wherein the one or both of the battery capacity and/or the battery cycle life of the secondary battery dropping by 50% or more compared to the corresponding battery capacity and/or the corresponding battery cycle life of the secondary battery at 25° C. is associated with lithium plating in the secondary battery.

4. The method of claim 1, wherein a difference between the lower temperature limit and the upper temperature limit is about 40° C. or lower.

5. The method of claim 4, wherein the lower temperature limit is about 15° C. or lower.

6. The method of claim 5, wherein the upper temperature limit is about 50° C. or higher.

7. The method of claim 1, wherein the contactless energy transfer means includes means other than convection or conduction.

8. The method of claim 7, wherein externally applying the electromagnetic energy comprises applying current through an energy transmit coil installed outside of the electric vehicle.

9. The method of claim 8, wherein converting the electromagnetic energy comprises inducing current in a receive coil installed on the electric vehicle by electromagnetic induction.

10. The method of claim 9, further comprising resistively heating a heating element using at least part of the induced current to generate the heat for heating the secondary battery.

11. The method of claim 8, wherein converting the electromagnetic energy comprises inducing eddy current in a conductor installed on the electric vehicle by electromagnetic induction.

12. The method of claim 11, further comprising resistively heating the conductor using at least part of the eddy current to generate the heat for heating the secondary battery.

13. The method of claim 7, wherein externally applying the electromagnetic energy comprises applying microwave energy to the electric vehicle using a microwave generator installed outside of the electric vehicle.

14. The method of claim 13, converting the electromagnetic energy comprises heating a fluid stored in the electric vehicle by the microwave energy to generate the heat for heating the secondary battery.

15. The method of claim 14, further comprising circulating the fluid that is heated by the microwave energy in proximity to the secondary battery to heat the secondary battery.

16. The method of claim 7, wherein externally applying the electromagnetic energy comprises applying photon radiation energy using a photon radiation generator installed outside of the electric vehicle.

17. The method of claim 16, wherein converting the electromagnetic energy comprises absorbing the photon radiation energy using an enhanced photon absorbing structure configured to reabsorb a substantial portion of photons that are reflected or scattered by the enhanced photon absorbing structure.

18. The method of claim 17, wherein the enhanced photon absorbing structure comprises a plurality of cavities having sidewalls that are configured such that a substantial portion of photons that are reflected or scattered by one of the sidewalls is absorbed by another one of the sidewalls.

19. The method of claim 17, wherein the enhanced photon absorbing structure comprises a plurality of protrusions having sidewalls that are configured such that a substantial portion of photons that are reflected or scattered by a sidewall of one of the protrusions is absorbed by a sidewall of another one of the protrusions.

20. The method of claim 19, wherein the protrusions comprise an array of protrusions having faceted surfaces.

21. The method of claim 19, wherein the protrusions comprise an array of protrusions having a sinusoidally varying surface.

22. The method of claim 1, wherein charging the secondary battery does not occur before the secondary battery reaches the temperature above the lower temperature limit.

23. The method of claim 1, further comprising, before or during externally applying the electromagnetic energy to heat the secondary battery to the temperature above the lower temperature limit, charging the secondary battery at a charging power less than the high charging power.

24. The method of claim 23, wherein a magnitude of the charging power less than the high charging power is inversely proportional to a state of charge of the secondary battery.

25. The method of claim 1, wherein maintaining the battery temperature between the lower temperature limit and the upper temperature limit comprises, during charging the secondary battery at the high charging power, determining that the battery temperature is above 25° C., and stopping externally applying the electromagnetic energy and stopping converting the electromagnetic energy.

26. The method of claim 1, wherein maintaining the battery temperature comprises actively cooling the secondary battery when the battery temperature exceeds the upper temperature limit.

* * * * *

UNITED STATES PATENT AND TRADEMARK OFFICE
CERTIFICATE OF CORRECTION

PATENT NO. : 11,420,527 B2
APPLICATION NO. : 17/303360
DATED : August 23, 2022
INVENTOR(S) : Dongyoung Lee et al.

Page 1 of 1

It is certified that error appears in the above-identified patent and that said Letters Patent is hereby corrected as shown below:

In the Drawings

Sheet 8 of 11 (Reference Numeral 220, 230) (FIG. 2B), Line 3, delete "covert" and insert -- convert --.

Sheet 9 of 11 (Reference Numeral 220, 230) (FIG. 2C), Line 3, delete "covert" and insert -- convert --.

Sheet 10 of 11 (Reference Numeral 220, 230) (FIG. 2D), Line 3, delete "covert" and insert -- convert --.

Sheet 11 of 11 (Reference Numeral 220, 230) (FIG. 2E), Line 3, delete "covert" and insert -- convert --.

In the Specification

Column 10, Line 58, delete "$\mu_r\mu_0$" and insert -- $\mu_r\mu_0$, --.

Column 11, Line 12, before "a" delete "the".

Column 16, Line 5, delete "0.5C" and insert -- 0.5C, --.

Signed and Sealed this
Seventeenth Day of January, 2023

*Katherine Kelly Vidal*

Katherine Kelly Vidal
*Director of the United States Patent and Trademark Office*